United States Patent [19]

Derdack et al.

[11] Patent Number: 4,685,487

[45] Date of Patent: Aug. 11, 1987

[54] SANITARY MIXING VALVE

[75] Inventors: Dieter Derdack, Wittlich; Wilfried Delker, North-Rhine, both of Fed. Rep. of Germany

[73] Assignee: American Standard Inc., New York, N.Y.

[21] Appl. No.: 840,845

[22] Filed: Mar. 18, 1986

[30] Foreign Application Priority Data

Mar. 18, 1985 [DE] Fed. Rep. of Germany ....... 3509667

[51] Int. Cl.$^4$ .............................................. F16K 23/00
[52] U.S. Cl. ................................. 137/315; 137/454.5; 137/625.4; 251/366; 251/368
[58] Field of Search ............... 137/454.2, 454.5, 625.4, 137/315; 251/366, 368

[56] References Cited

U.S. PATENT DOCUMENTS

| 302,022 | 7/1884 | Peck | 137/454.5 |
| 1,714,606 | 5/1929 | Lotz | 251/368 X |
| 2,877,797 | 3/1959 | Jordan | 137/625.4 |
| 3,190,312 | 6/1965 | Classen | 137/625.4 |
| 3,533,436 | 10/1970 | Parkison | 137/625.4 X |
| 3,547,403 | 12/1970 | Grauer | 251/368 X |
| 3,667,503 | 6/1972 | Farrell | 137/625.4 |

*Primary Examiner*—Harold W. Weakley
*Attorney, Agent, or Firm*—James J. Salerno, Jr.; Robert G. Crooks; John P. Sinnott

[57] ABSTRACT

The present invention is directed to a sanitary mixing valve in which the valve housing is made of a ceramic material of unitary design and is interchangeable by being removably mounted to a connecting member having a cartridge valve assembly mounted thereto.

5 Claims, 1 Drawing Figure

U.S. Patent   Aug. 11, 1987   4,685,487
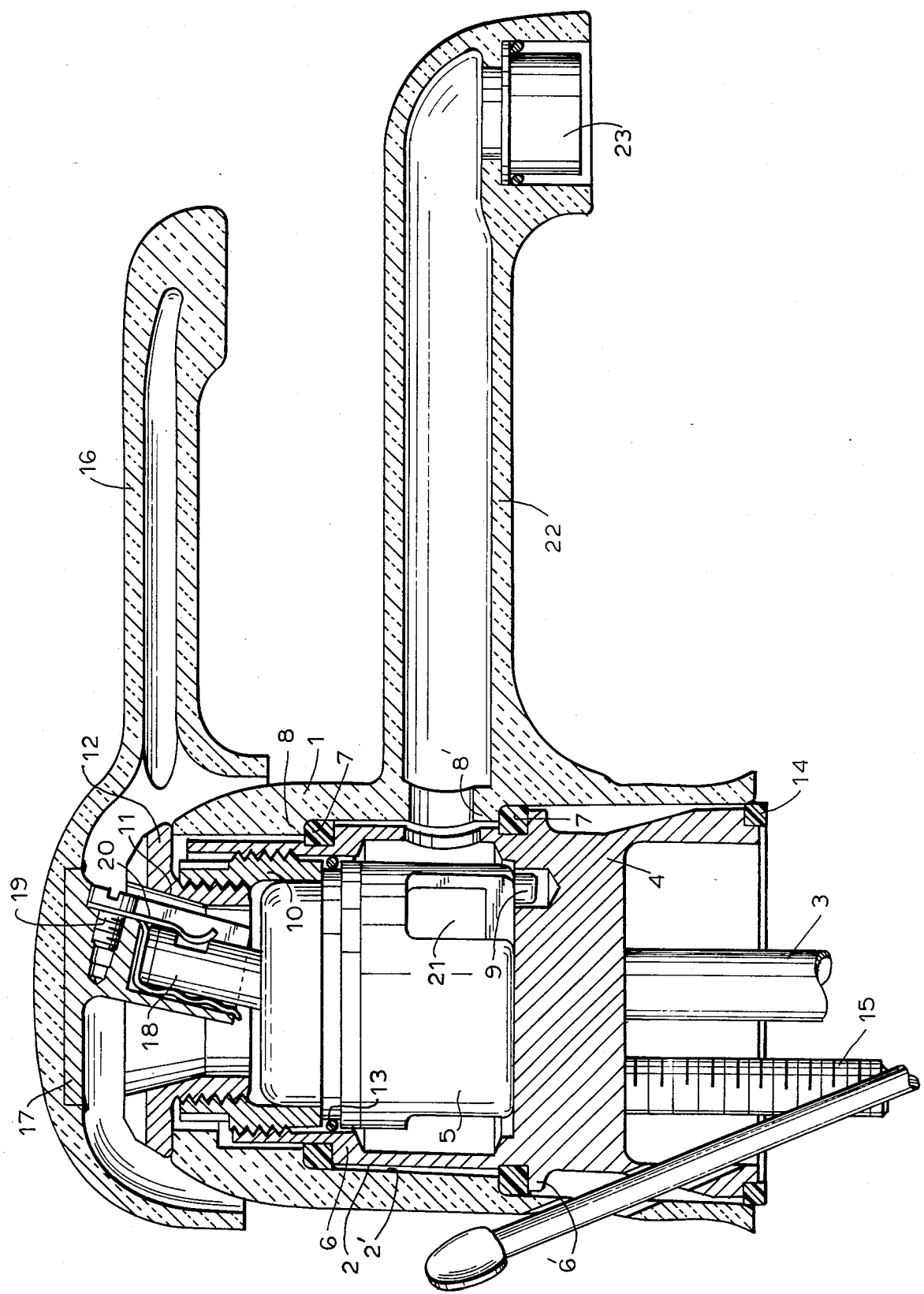

SANITARY MIXING VALVE

BACKGROUND OF THE INVENTION

The invention relates to a sanitary mixing valve, particularly with a colored valve body to receive the control elements.

DESCRIPTION OF THE PRIOR ART

Mixing valves of this type, having colored valve bodies, are known for many years and are installed, particularly, in bathrooms and kitchens. As a general rule, the valve bodies are made of brass and have metallic or non-metallic surfaces. When making valve bodies of different colors, it is the practice either to coat them with a lacquer and, when it has dried, it is protected by a layer of transparent synthetic resin, or to apply a powder coating which is baked.

A disadvantage of previous valves of this type is that the metallic or non-metallic surfaces are not resistant either to cleaning materials or scratching and, because of the high heat conductivity of brass, are subject to considerable abrupt fluctuations in temperature, which is unpleasant to the user. Additionally, it is difficult, from the point of view of the manufacturing process, to provide decorations, ornamental features, markings or the like on the conventional surfaces. Also, chromium plated valve bodies are subject to calcification. Another disadvantage is that the previous valve bodies, when damaged, are not interchangeable and cannot be replaced or, if replaceable, only at considerable expense.

SUMMARY OF THE INVENTION

The object of the invention is to avoid these disadvantages and to provide a mixing valve of the above type which is simple to manufacture, reliable in its operation, easy to assemble and easy to repair.

This object is achieved in that the valve body is of unitary design and is made of a ceramic material. The valve body is interchangeable and/or replaceable and is removably mounted to a connecting member. The connecting member and valve body are mounted in watertight engagement by seals interposed therebetween. The connecting member includes water supply passages which can be connected to the water installation and fixed to a sanitary appliance or a wall.

BRIEF DESCRIPTION OF THE DRAWINGS

An example of the invention, in the form of a single-lever mixing assembly for wash stands, is shown in longitudinal section in the accompanying drawing in which:

FIG. 1 is a sectional view, in elevation, of a sanitary mixing valve of the invention herein fully assembled.

DETAILED DESCRIPTION OF THE PREFERRED EMBODIMENT

In the drawing, 1 refers to a valve body. It is made of porcelain and has a glazed surface. The valve body 1 contains a connecting member 2' in the form of a sleeve-shaped inner brass housing with connecting pipes 3 for hot and cold water. The pipes 3 are fixed to a base portion 4 and connected to water supply passages, not shown, therein A cartridge 5, with valve control elements with seals, is arranged on the base portion 4. The inner body 2 will be seen to have two collar-like steps 6, 6' extending around the outer surface, the lower step 6' being larger in diameter than its upper step 6. The function of the steps 6, 6' is to hold axial seals 7 in the form of O-rings, which interact with corresponding steps 8, 8' formed inside the valve body 1 to provide a watertight seal.

The cartridge 5 is held in position by means of a peg 9. The cartridge 5 is fixed by means of a threaded brass ring 10, which is held in the top end of the inner body 2 in which there is a further threaded ring 11 made of plastic. The ring 11 has an outer collar 12 which engages over the top end of the valve body 1 and secures it in position. The cartridge 5 is sealed laterally from the inner body 2 by an O-ring 13.

The valve body 1 is made in one piece and is interchangeable and/or replaceable. It can be put over the premountable inner body 2, which is fixed on the fitment support, not shown, of a wash stand with a lower seal 14 interposed by means of a threaded stud bolt 15.

The handle lever 16 has a support 17 at the top end of a control lever 18 bonded thereto. The lever 18 is joined to the support 17 by a spring element 20 which is held by means of a screw 19. The lower end of the control lever 18 interacts with disc-shaped control elements, not shown, in the cartridge 5. Water flows out of the cartridge through an opening 21 into the outlet 22. The front end of the outlet is fitted with a jet control 23, to prevent high internal pressure which may be produced if the water/air mixing nozzles are blocked.

A valve, according to the invention, is easy to assemble and easy to repair. For assembly, the connecting member 2' is first fixed to the wash stand to avoid any damage to the valve body. The valve body 1 is then simply put over the premounted connecting member 2' with the seals 7 interposed, and the assembly is mounted by means of the threaded plastic ring 11. The nature of the seal and construction of the valve body 1 and inner body 2 or connecting member 2' ensure that no tolerance problems will arise between the two different materials, ceramic and brass.

The construction described and illustrated is only an example of the invention. The invention is not restricted to it, and there are other possibilities in the framework of the basic invention, particularly with regard to the arrangement and form of the various components. Thus, the outside of the inner body and the inside of the valve body could be substantially unstepped, and radial sealing could be provided between both inner and outer bodies with lip seals.

The manufacture of a valve, according to the invention, does not encounter difficulties. The cost is relatively low. The ceramic valve bodies, which have far lower heat conductivity than metal designs and which, therefore, remain at a comfortable temperature in operation, can easily be produced in any desired colors and shapes, and provided with any desired decorations, ornamental features, markings, etc. This also means that the easy-care valve bodies can be provided without any difficulty with glaze-baked surfaces, corresponding to those of colored sinks, wash stands, bidets, etc. There is no danger of calcification. The surfaces are resistant to cleaning materials and scratching.

We claim:

1. A sanitary mixing valve comprising:
   an interchangeable valve body made of ceramic material and a replaceable cartridge having control elements operably mounted therein;
   said valve body, being of unitary design, is removabl mounted to a connecting member;

said connecting member including a cylindrically shaped housing having a base portion which is formed having water supply passages therein, is mounted to said control elements;

sealing means interposed between said valve body and said connecting member to provide a watertight fit;

said control elements mounted to said base portion;

said housing formed with collar-like steps extending around the outside surface thereof;

each of said collar-like steps having differing diameters which increase downwardly toward the base portion thereof;

each of said collar-like steps, having an axial seal mounted thereon and which interacts with corresponding steps formed around the inner surface of said valve body to provide a watertight seal therebetween;

said cartridge having an externally threaded upper end;

an internally threaded ring being coupled to said threaded upper end of said cartridge to hold said inner housing in place; and a second threaded ring having a horizontally extending collar which threadedly engages said internally threaded ring to mount said cartridge to said valve body.

2. The valve of claim 1 wherein said connecting member is in the form of a cylindrically shaped inner housing having a base portion which is formed with water supply passages and which has said control elements thereto; and seal means interposed between the outer surface of said inner housing and the inner surface of said valve body to provide a watertight fit.

3. The valve of claim 2 wherein said seal means interposed between the surfaces of said inner and outer housings is a lip seal.

4. The valve of claim 1 wherein said valve housing is made of porcelain.

5. The valve of claim 4 where the outer surface of said valve housing includes a glaze.

* * * * *